United States Patent
Furuyama

(10) Patent No.: US 7,024,100 B1
(45) Date of Patent: Apr. 4, 2006

(54) VIDEO STORAGE AND RETRIEVAL APPARATUS

(75) Inventor: Hiroshi Furuyama, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/532,735

(22) Filed: Mar. 22, 2000

(30) Foreign Application Priority Data

Mar. 26, 1999 (JP) ................................. 11-084337

(51) Int. Cl.
*H04N 5/91* (2006.01)
(52) U.S. Cl. ........................................ 386/98; 386/112
(58) Field of Classification Search ................ 386/46, 386/96, 98, 111, 112, 125, 126, 95; 370/535
See application file for complete search history.

(56) References Cited

U.S. PATENT DOCUMENTS

| | | | |
|---|---|---|---|
| 6,069,902 A | 5/2000 | Kurano et al. | |
| 6,169,843 B1 * | 1/2001 | Lenihan et al. | 386/46 |
| 6,185,228 B1 * | 2/2001 | Takashimizu et al. | 370/535 |
| 6,233,389 B1 * | 5/2001 | Barton et al. | 386/46 |
| 6,334,022 B1 | 12/2001 | Ohba et al. | |
| 6,643,449 B1 * | 11/2003 | Nagata et al. | 386/46 |
| 2001/0028780 A1 * | 10/2001 | Na et al. | 386/46 |

FOREIGN PATENT DOCUMENTS

| | | |
|---|---|---|
| EP | 0749244 | 12/1996 |
| JP | 8-130701 | 5/1996 |
| JP | 9-135422 | 5/1997 |
| JP | 9-139915 | 5/1997 |
| JP | 10178614 | 6/1998 |
| JP | 10-243352 | 9/1998 |

OTHER PUBLICATIONS

English language abstract of JP 10-178614.
English language abstract of JP 8-130701.
English language Abstract of JP 8-130701.
English language Abstract of JP 10-243352.
English Language Abstract of P 9-135422.
English Language Abstract of JP 8-130701.
English Language Abstract of JP 9-139915.

* cited by examiner

*Primary Examiner*—Huy Nguyen
(74) *Attorney, Agent, or Firm*—Greenblum & Bernstein, P.L.C.

(57) ABSTRACT

An apparatus of the present invention has a storage that stores a data stream in which identification data with identification information for retrieval incorporated therein is multiplexed along with video data and audio data, a plurality of demultiplexing sections that demultiplex the stored data stream to the video data, audio data and identification data, a video data and audio data decoding section that decodes the video data and audio data, each demultiplexed, to reproduce, and a retrieval section that retrieves specific video data and specific audio data based on the demultiplexed identification data, and thus executes the video reproduction and retrieval in parallel.

9 Claims, 12 Drawing Sheets

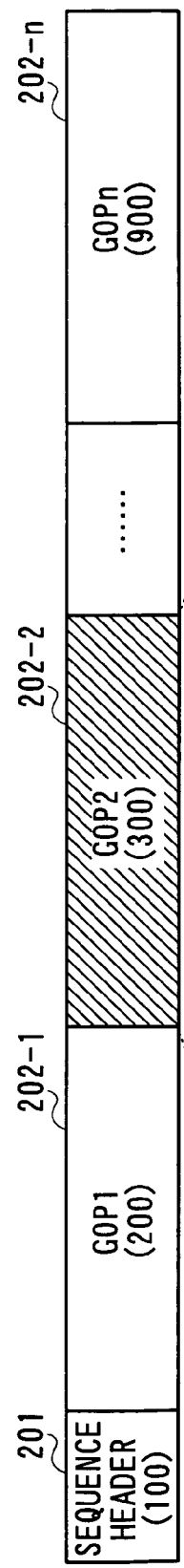
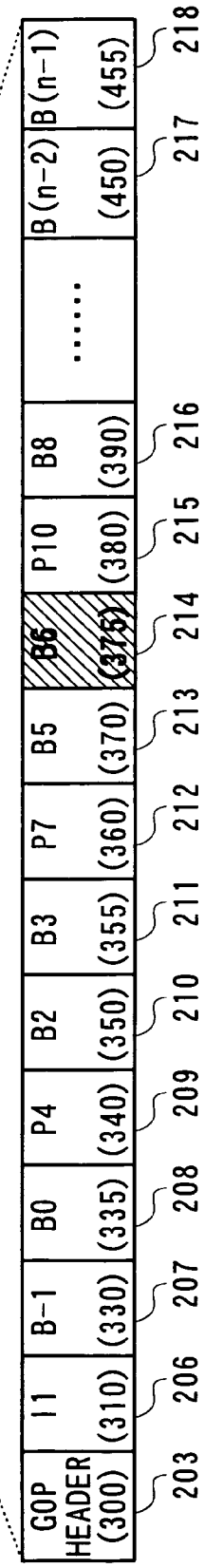
FIG. 3A
FIG. 3B
FIG. 3C

VIDEO STORAGE AND RETRIEVAL APPARATUS

BACKGROUND OF THE INVENTION

1. Field of the Invention

The present invention relates to an apparatus and method for retrieving a scene that a user desires, based on identification information inserted in digital video signals, from a recording media with the digital video signals recorded therein, to reproduce.

2. Description of the Related Art

Japanese Unexamined Patent Publication 8-130701 discloses a video retrieving apparatus that searches a desired scene based on the contents of the moving video to reproduce. FIG. 1 is a schematic configuration diagram of a video retrieving apparatus described in Japanese Unexamined Patent Publication 8-130701.

In FIG. 1, recorded in storage section 10 is video data comprised of bitstreams conforming to MPEG (International Standard for Moving Picture Coding). Identification information indicative of the contents of the scene corresponding to the user area is inserted in the user data area in the bitstreams. MPEG decoder 20 has a user area code extraction section 28 that extracts the identification information inserted in the user data area. Retrieval section 30 is comprised of retrieval information input section 32 to which the contents of the scene a user desires are input, comparison section 31 which compares the contents input from retrieval information input section 32 to the extracted contents by the user area code extraction section 28.

When the contents of the desired scene is input from retrieval information input section 32, control section 12 is provided with an instruction to retrieve the video signal having the identification information matching the retrieval scene from video signals in storage section 11. Then, when the retrieval scene and identification information match, retrieval section 30 provides an instruction indicative of ON to MPEG decoder 20, and then the decoding and indication of the corresponding video signals (scene) are initiated.

The case expected as an example of using the video retrieving apparatus is that a desired scene is retrieved from a program while another program is reproduced. For example, there is the case that a user searches the tomorrow weather forecast from a recorded news program to reproduce while reproducing, for example, a recorded drama program. Such a case demands a user interface which executes the retrieval without discontinuing the reproduced drama program, and starts reproducing the video of the retrieved weather forecast immediately after the retrieval is finished or after the reproduced program is finished. To achieve such a user interface, it is necessary to execute processing for the video reproduction and retrieval in parallel.

To execute the retrieval of the video from the identification information inserted in the bitstreams conforming to MPEG, it is necessary to extract the data from the user data area in the bitstreams. However, it is not possible for one MPEG decoder as in the video retrieving apparatus illustrated in FIG. 1 to execute the processing for the video reproduction and retrieval in parallel.

SUMMARY OF THE INVENTION

The present invention is carried out in view of the foregoing, and an object of the present invention is to provide a video strage and retrieval apparatus capable of executing the reproduction of a video and the retrieval of a desired scene in parallel, and providing excellence as a user interface with good operability provided.

In various data streams including an MPEG stream, compressed coded video streams, audio streams, and private streams to store user data are multiplexed (hereinafter, the private stream is called retrieval data stream since identification information for retrieval is used as the user data in the present invention).

Execution of the reproduction and retrieval from the above-mentioned data streams requires a demultiplexing function for demultiplexing the multiplexed data streams to the private streams, video streams and audio streams, a video decoding and audio decoding function for extending the compressed coded video and audio data to decode, and a retrieval function for executing the retrieval. Accordingly, to execute the reproduction and retrieval in parallel, it is necessary to concurrently process streams being reproduced and streams for retrieval, however the function requiring concurrent processing is only the demultiplexing function.

The present invention enables the concurrent execution of the reproduction of video and retrieval by providing a plurality of demultiplexing sections.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 3A is a diagram illustrating an exemplary structure of a MPEG stream according to the above embodiment;

FIG. 3B is a diagram illustrating an exemplary structure of video signal;

FIG. 3C is a diagram illustrating an exemplary structure of GOP;

DETAILED DESCRIPTION OF THE PREFERRED EMBODIMENTS

Embodiments of the present invention will be described below with reference to accompanying drawings. The following description explains as an example of data stream the MPEG bitstream conforming to the MPEG that is the moving picture coding standard. However, it is obvious that the present invention is applicable to the data stream other than the MPEG stream conforming to the MPEG that is the moving picture coding standard.

First Embodiment

Figure 1:
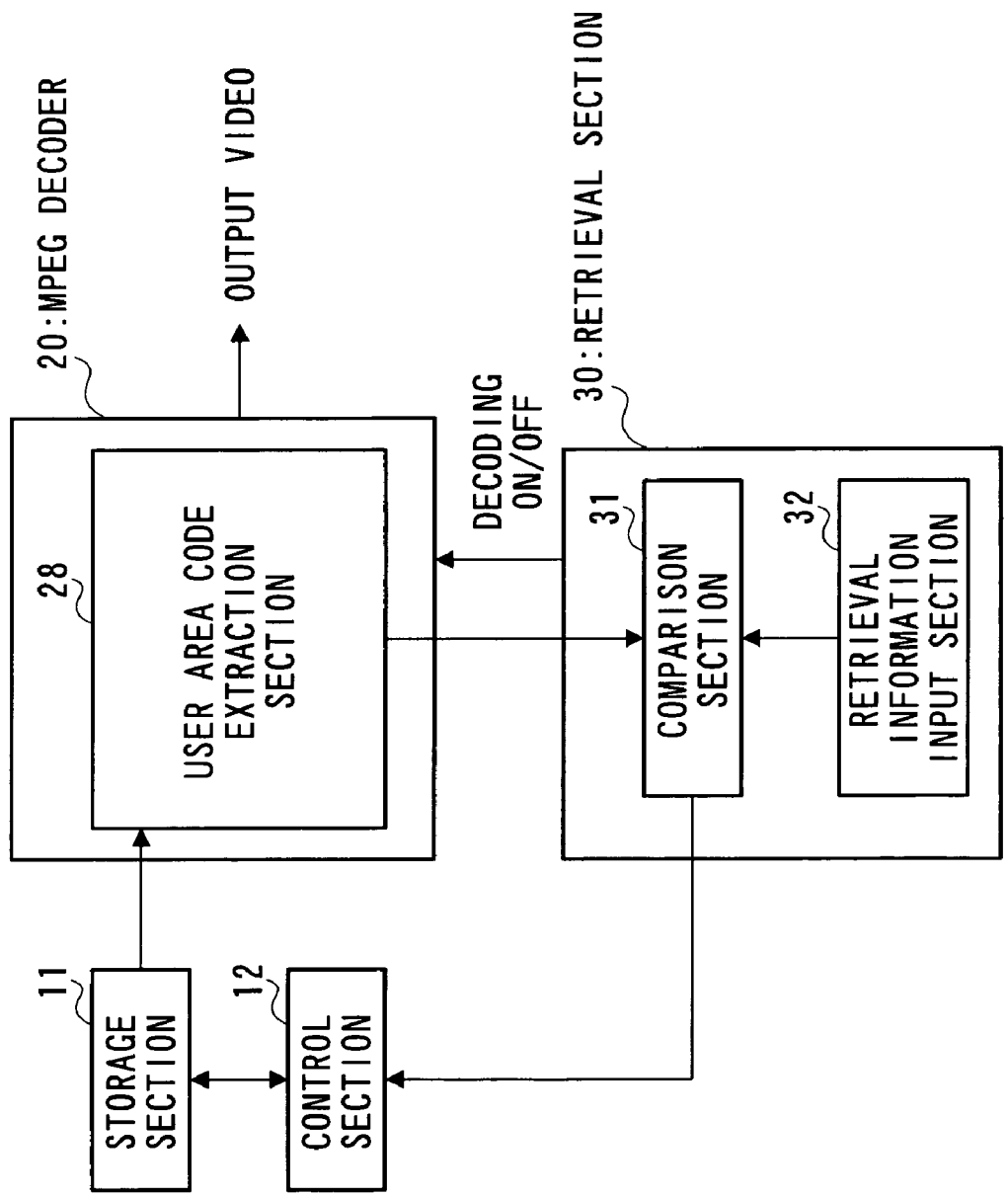
FIG. 1 is a schematic configuration diagram to explain a conventional video storage and retrieval apparatus.
Figure 2:
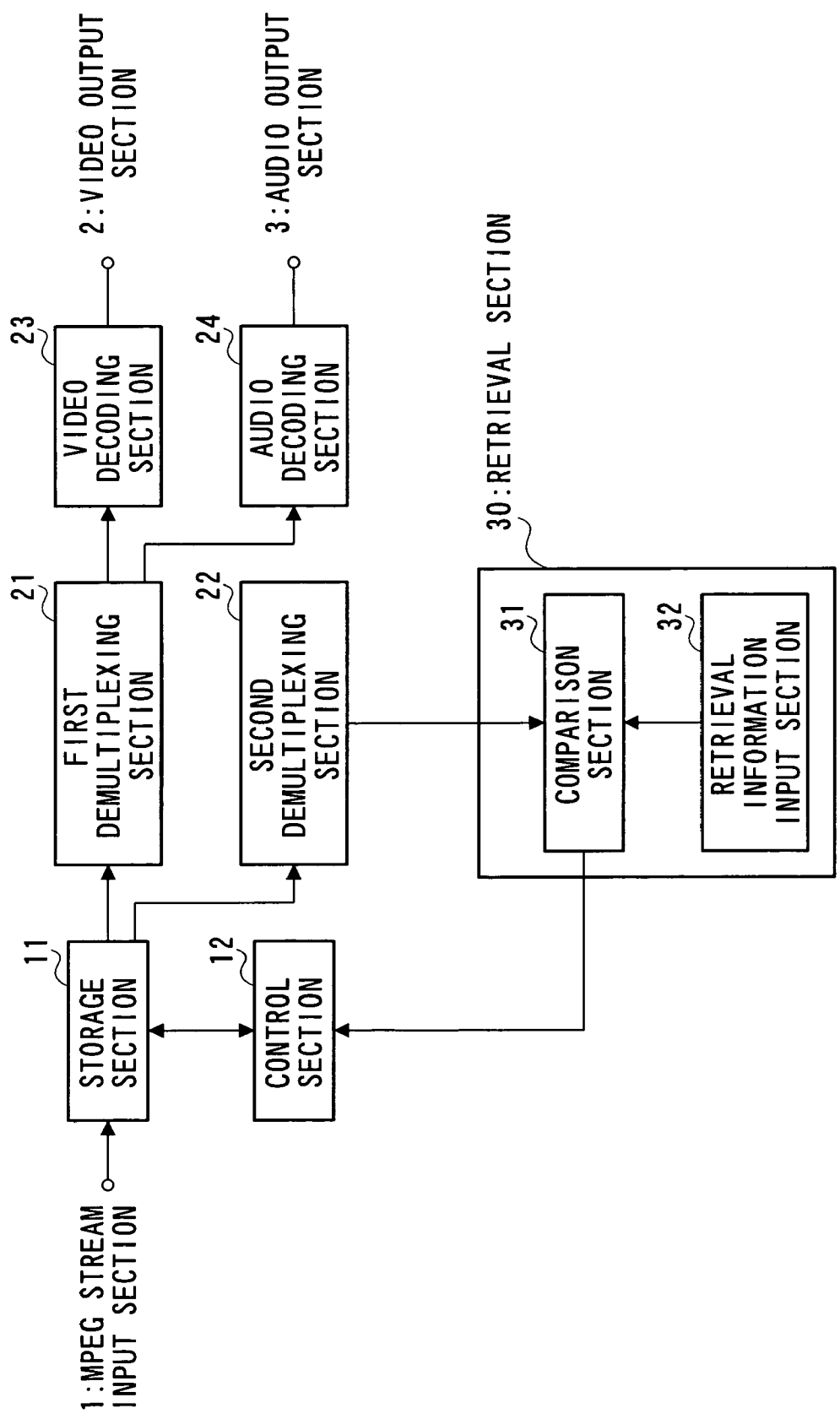
FIG. 2 is a schematic configuration diagram of a video storage and retrieval apparatus according to a first embodiment.

FIG. 2 is a block diagram of a video storage and retrieval apparatus according to the first embodiment of the present invention. The video storage and retrieval apparatus is comprised of MPEG stream input section 1 to which the MPEG stream is input, video output section 2 which outputs a decoded video signal, and audio output section 3 which outputs a decoded audio signal. The MPEG stream received in MPEG stream input section 1 is stored in storage section 11. Storage section 11 has a plurality of output ports, and the recorded plurality of MPEG streams can be accessed concurrently. Storage section 11 is controlled by control section 12. Control section 12 controls the read of the MPEG stream stored in storage section 11 according to the instruction from retrieval section 30.

Two output ports of storage section 11 are coupled to respective first demultiplexing section 21 and second demultiplexing section 22 which can be accessed concurrently. First demultiplexing section 21 demultiplexes video streams and audio streams from the MPEG stream read from storage section 11 to reproduce. Second demultiplexing section 22 demultiplexes retrieval streams form the MPEG stream read from storage section 11 to retrieve. The video streams, audio streams and retrieval streams are multiplexed in the MPEG stream.

First demultiplexing section 21 is connected to video decoding section 23 and audio decoding section 24 in parallel. Video decoding section 23 extends the compressed video streams to decode, and outputs the decoded signal to video output section 2. Audio decoding section 24 extends the compressed audio streams to decode, and outputs the decoded signal to audio output section 3. Video decoding section 23 and audio decoding section 24 operate synchronously.

Retrieval section 30 is comprised of comparison section 31 and retrieval information input section 32. Retrieval information input section 32 receives the inputted retrieval information(contents of the scene). Comparison section 31 compares the identification information in the retrieval data stream, which is read from storage section 11 and then demultiplexed in second demultiplexing section 22, to the retrieval scene from retrieval information input section 32, while instructing control section 12 on the read of the MPEG stream to retrieve.

FIG. 3A illustrates an exemplary structure of the MPEG stream in this embodiment. As illustrated in FIG. 3A, the MPEG stream is comprised of stream header 101 to store stream information, a plurality of coded video streams (video stream (1) 102 to video stream (n) 105), a plurality of coded audio streams (audio stream (1) 103 to audio stream (n) 106), and a plurality of retrieval data streams (retrieval data stream (1) 104 to retrieval data stream (n) 106) as identification data with identification information for retrieval incorporated therein.

The identification information indicative of the contents of the corresponding scene is recorded in the retrieval data stream along with PTS (Presentation Time Stamp) that is information to synchronously reproduce the corresponding video data streams and audio data streams, or time code. And each of the video data streams, the audio data streams and the retrieval data streams is constructed in packets and multiplexed as PES (Packetized Elementary Stream). Further, it may be possible to insert the retrieval data streams as a private descriptor in the PAT (Program Association Table), PMT (Program Map Table) or CAT (Conditional Access Table) to multiplex with the video data and audio data.

FIG. 3B is an exemplary structure of the video signals comprised of a plurality of GOPs (Group of Picture) comprised of coded video data, and FIG. 3C illustrates an exemplary structure of a GOP header. The picture sequence illustrated in FIG. 3B is constructed in packets, and stored as element data in video stream (1) 102 to video stream (n) 105 in the MPEG stream illustrated in FIG. 3A.

The GOP is a group comprised of a series of I picture, P picture and B picture obtained by coding timewise successive picture frames (or fields). In an apparatus for coding a video signal to record and reproduce, the GOP is comprised of the I picture obtained by coding image in a frame (or field), the P picture obtained by executing motion compensation inter-frame (or picture) coding referring to the I picture, another P picture obtained by executing motion picture compensation inter-frame (or picture) referring to the P picture obtained by executing the inter-frame (or picture) coding as described above, and the B picture obtained by executing bidirectional motion compensation inter-frame (or field) coding referring to I pictures or P pictures between which the corresponding picture (or frame) exists timewise successively.

As illustrated in FIG. 3B, the sequence of coded video signals is comprised of a sequence header 201 and a plurality of GOPs (first GOP="GOP1", thereafter, the data number is assigned to the same type of data in the same way as described above) 202-1 to 202-n. FIG. 3C illustrates a detail of the inside of GOP2 (202-2). GOP2 is comprised of header 203, one or a plurality of I pictures 206, a plurality of P pictures 209, 212 and 215, and a plurality of B pictures 207, 208, 210, 211, 213, 214, 216, 217 and 218. The numbers described in respective parenthesis each indicates a head address of each data.

The processing is executed on a GOP-by-GOP basis in decoding the video signal. Video decoding section 23 executes decoding of pictures input in the order of I1, B-1, B0, P4, B2, B3, . . . . The decoded video signal is output to a display device through video output section 2, and displayed in the order of frames (B-1), (B0), I1, B2, B3, P4 . . . .

In addition, the PTS to synchronously reproduce the video signal and audio signal is inserted to respective header areas of video stream (1) 102 to video stream (n) 105 and audio stream (1) 103 to audio stream (n) 106. The time stamps is inserted in a header area (203) of GOP1 (202-1) to GOPn (202-n).

The operation of the apparatus of this embodiment with the configuration as described above is next explained. When control section 12 receives a reproduction instruction from a user interface, not shown in the figure, with a program address or program identification number designated, control section 12 provides the reproduction instruction to storage section 11 while specifying a header address of the MPEG stream of the instructed program. As a result of the instruction, the MPEG stream of the program instructed by control section 12 is provided from one of output ports of storage section 11 to first demultiplexing section 21. First demultiplexing section 21 demultiplexes the video streams and audio streams from the MPEG stream. The demultiplexed video streams are decoded in video decoding section 23, and the demultiplexed audio streams are decoded in audio decoding section 24. Then, the video signal and audio signal are synchronously output from video output section and audio output section 3.

Thus, the present invention enables the retrieval of the desired data stream from storage section 11 even when the program is reproduced. In other words, when the contents of a scene to be retrieved is input to retrieval information input section 32 of retrieval section 30 from a user, comparison section 31 instructs control section 12 so that the MPEG stream for retrieval is output from storage section 11. At this time, second demultiplexing section 22 accesses another output port other than the output port outputting the MPEG stream being reproduced. Second demultiplexing section 22 demultiplexes the retrieval data stream from the MPEG stream for retrieval. Then, the identification information inserted in the retrieval data stream is output from second demultiplexing section 22 to comparison section 31.

Comparison section 31 compares the retrieval scene input to retrieval information input section 32 to the identification information in the retrieval data stream, and instructs control section 12 to read out the MPEG stream stored in storage section 11 until the retrieval scene and the identification information match.

Further, second demultiplexing section 22 refers to the PTS or a value of the time code stored in the retrieval data stream, and calculates the GOP head address of the corresponding picture frames, and the number of the corresponding picture frames starting from the GOP head frame, to output to retrieval section 30.

When the retrieval scene and identification information match in comparison section 31, retrieval section 30 holds the GOP head address of the corresponding picture frames and the number of the corresponding picture frames starting from GOP head frame. Then, retrieval section 30 notifies control section 12 of the GOP head address and the number of the frames from the GOP head frame when instructs control section 12 to reproduce the retrieved scene. Thereby, it is possible to access directly the desired picture frame when the reproduction of the retrieved picture starts.

As described above, according to this embodiment, since first demultiplexing section 21 and second demultiplexing section 22 are provided, it is possible to concurrently execute the reproduction and retrieval.

In addition, it may be possible to provide a plurality of second demultiplexing sections 22 that execute the demultiplexing to extract the retrieval information and a plurality of retrieval sections 30 that search specific video and audio data based on the identification data so that the plurality of second demultiplexing sections 22 and retrieval sections 30 execute the retrieval processing in parallel on a plurality of data streams stored in storage section 11. Thereby, it is possible to speed up the retrieval processing.

Further, it may be possible that the data stream is input to second demultiplexing section 22, which executes the demultiplexing to extract the retrieval information, at a rate higher than the data transfer rate at which the data stream is input to first demultiplexing section 21 which executes the demultiplexing to reproduce the video and audio, in order to speed up the retrieval processing.

Second Embodiment

Figure 4:
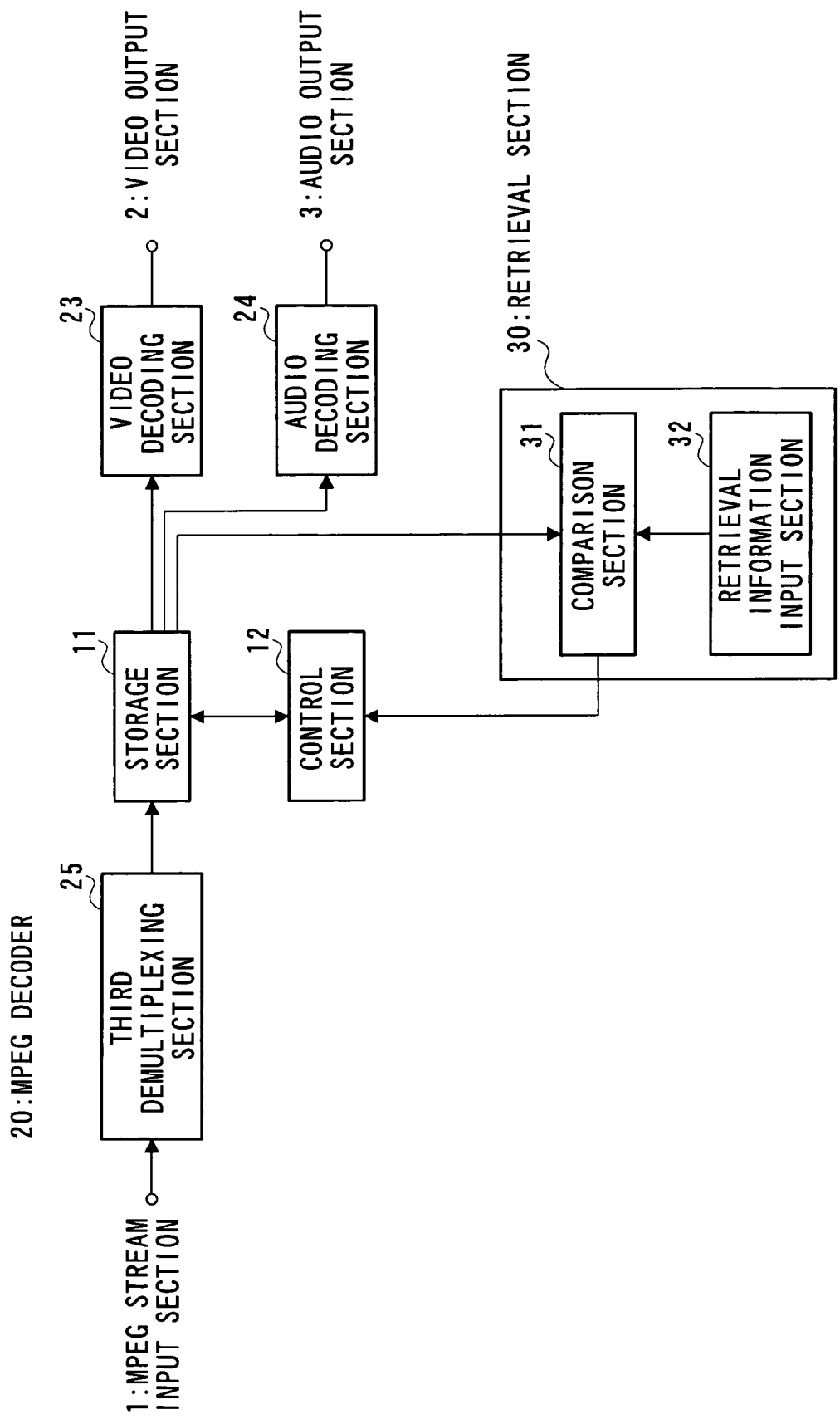
FIG. 4 is a schematic configuration diagram of a video storage and retrieval apparatus according to a second embodiment.

FIG. 4 is a block diagram of a video storage and retrieval apparatus according to the second embodiment of the present invention. In addition, the section with the same function as in FIG. 2 is given the same mark as in FIG. 2 to omit the specific explanation thereof in the following.

In the video storage and retrieval apparatus of this embodiment, third demultiplexing section 25 is provided between MPEG stream input section 1 and storage section 11. Third demultiplexing section 25 demultiplexes an input multiplexed MPEG stream to video streams, audio streams and retrieval data streams. The demultiplexed video streams, audio streams and retrieval data streams are recorded in storage section 11. Storage section 11 has three output ports. The output ports of storage section 11 are respectively connected to video decoding section 23, audio decoding section 24 and comparison section 31 of retrieval section 30.

The operation of the video storage and retrieval apparatus according to the second embodiment is explained below. The multiplexed MPEG stream is input to MPEG stream input section 1, and demultiplexed in third demultiplexing section 25 to video streams, audio streams and retrieval data streams, which are stored in storage section 11.

At the time the video is reproduced, the video streams are input to video decoding section 23, while the audio streams are input to audio decoding section 24, both from storage section 11, and the video and audio are synchronously output from respective sections.

In addition, at the time the video is retrieved, the retrieval data streams stored in storage section 11 are input to retrieval section 30, and therein the same retrieval processing as in the first embodiment is executed. Comparison section 31 searches the retrieval data stream in which the identification information matches the retrieval scene, while referring to the PTS or a value of the time code stored in the retrieval data stream, and calculating the GOP head address of the corresponding picture frames, and the number of the corresponding picture frames from the GOP head frame. The calculated values are used in reproducing the retrieved scene.

As described above, the video streams, audio streams and retrieval data streams demultiplexed from the MPEG stream are stored in storage section 11, while the video streams, audio streams and searches data stream stored in storage section 11 are made independently accessible, and therefore it is possible to execute the reproduction of the video and audio, and the retrieval at the same time.

Third Embodiment

Figure 5:
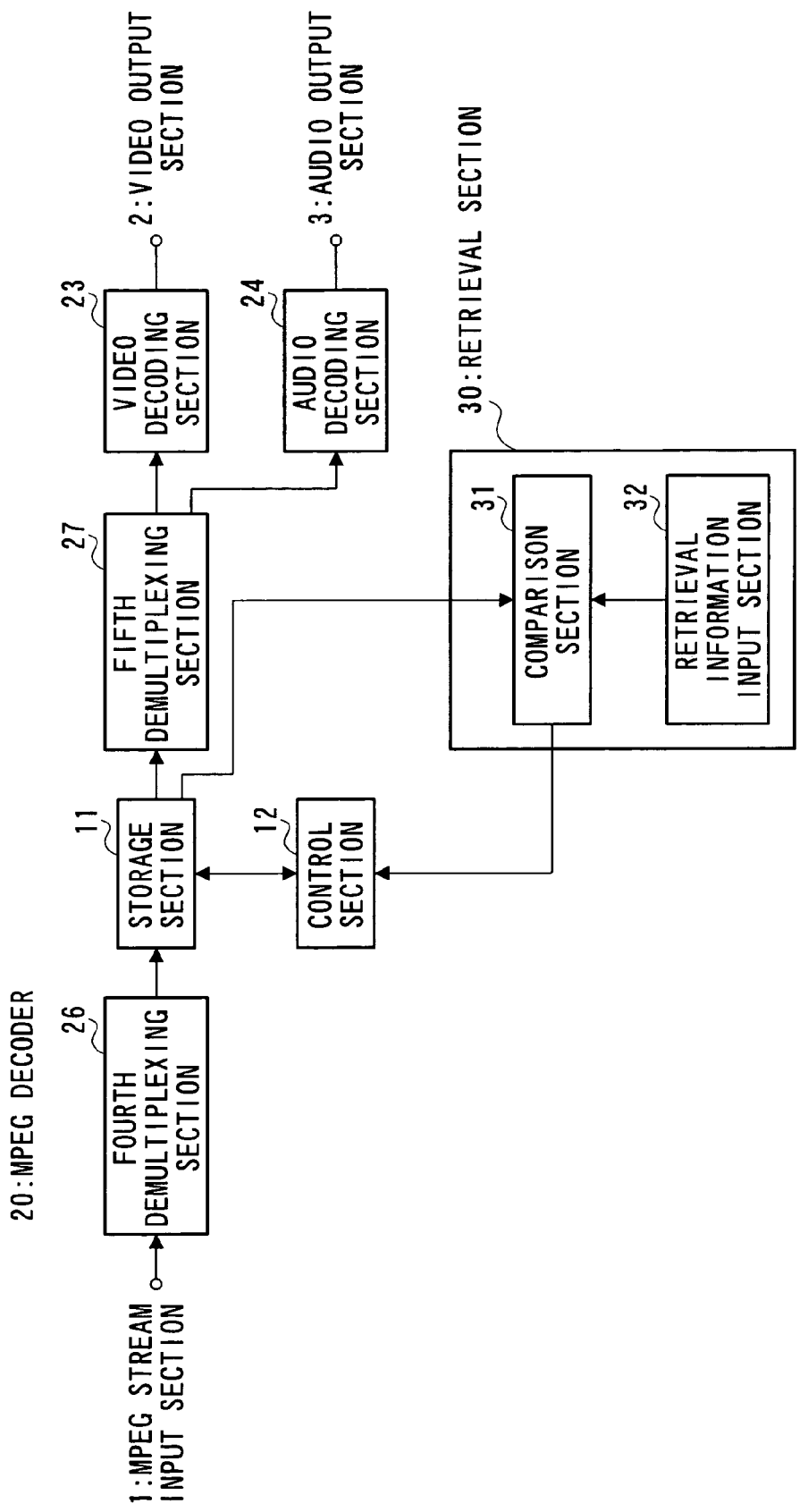
FIG. 5 is a schematic configuration diagram of a video storage and retrieval apparatus according to a third embodiment.

FIG. 5 is a block diagram of a video storage and retrieval apparatus according to the third embodiment of the present invention. In addition, the section with the same function as in FIG. 2 is given the same mark as in FIG. 2 to omit the specific explanation thereof in the following. In the video storage and retrieval apparatus of this embodiment, fourth demultiplexing section 26 is provided between MPEG stream input section 1 and storage section 11, and fifth demultiplexing section 27 is provided between storage section 11, and video decoding section 23 and audio decoding section 24. Fourth demultiplexing section 26 demultiplexes the multiplexed MPEG stream to a data stream in which video streams and audio streams are multiplexed, and retrieval data streams. Fifth demultiplexing section 27 demultiplexes the multiplexed video streams and audio streams to video streams and audio streams.

Figure 6A:
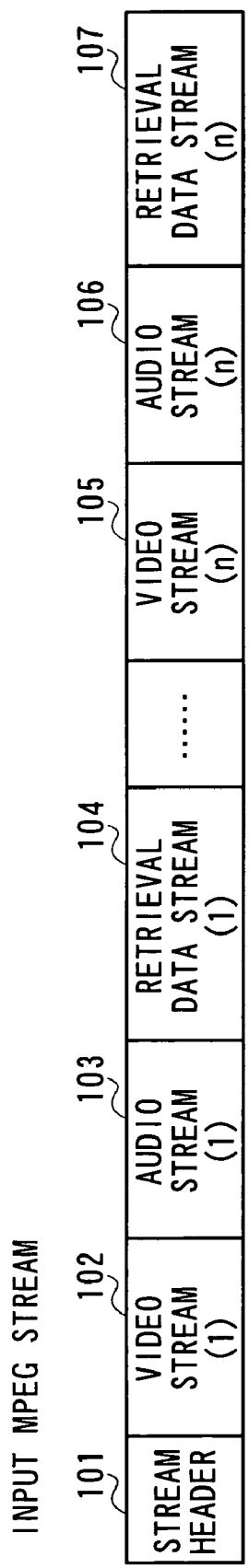
FIG. 6A is a diagram illustrating an exemplary structure of a MPEG stream according to the third embodiment.
Figure 6B:
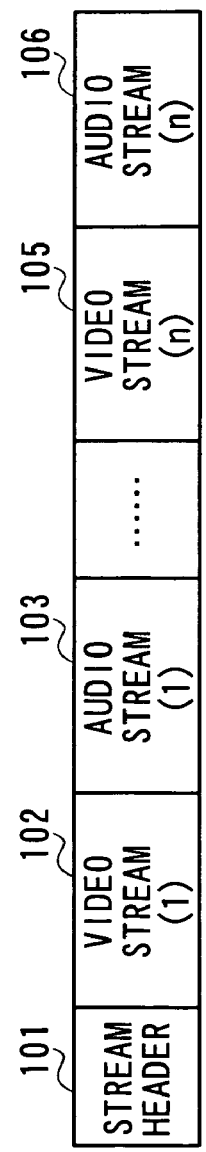
FIG. 6B is a diagram illustrating an exemplary structure of a demultiplexed data stream.
Figure 6C:
FIG. 6C is a diagram illustrating an exemplary structure of a data stream for retrieval.

FIG. 6A illustrates a structure of the MPEG stream input to fourth multiplexing section 26, and FIG. 6B illustrates structures of the MPEG streams output from fourth demultiplexing section 26.

The operation of the video storage and retrieval apparatus according to this embodiment is explained below. The multiplexed MPEG stream, input to MPEG stream input section 1, is demultiplexed to video streams, audio streams and retrieval data streams in fourth demultiplexing section 26, which multiplexes again demultiplexed video streams and audio streams, while adding stream header 111 thereto, to output. The retrieval data streams and multiplexed video streams and audio streams are stored in storage section 11.

At the time the video is reproduced, the multiplexed video streams and audio streams, stored in storage section 11, are demultiplexed to the video streams and audio streams by fifth demultiplexing section 27. The video streams and audio streams are converted into video signals and audio signals in video decoding section 23 and audio decoding section 24, and output therefrom, respectively.

At the time the video is retrieved, the retrieval data streams stored in storage section 11 are input to retrieval section 30, and the retrieval processing is executed therein. At this time, the retrieval data streams, and the multiplexed video streams and audio streams can be accessed independently, and accordingly, it is possible to execute the reproduction of the video and audio, and the retrieval at the same time.

Fourth Embodiment

Figure 7:
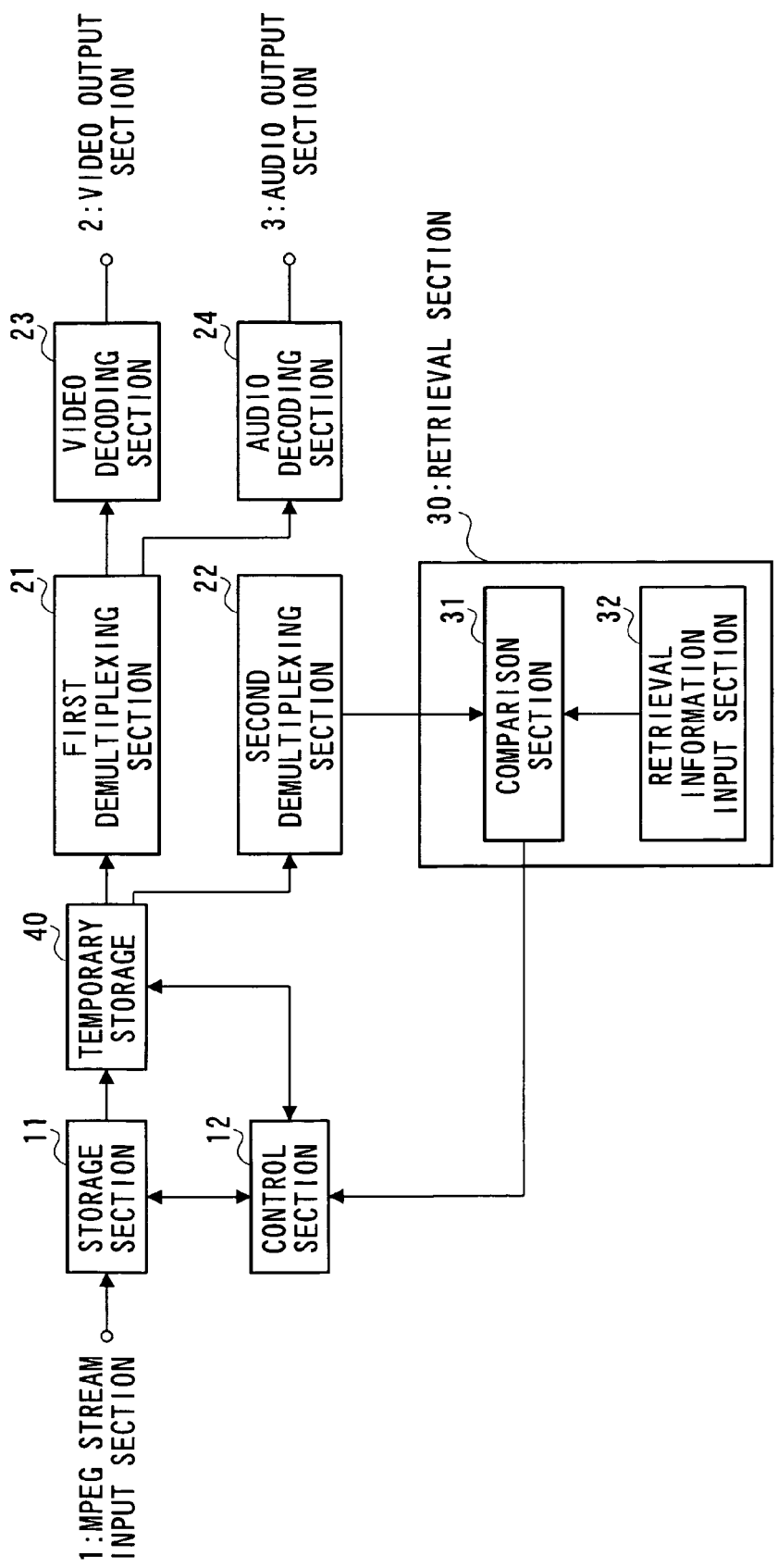
FIG. 7 is a schematic configuration diagram of a video storage and retrieval apparatus according to a fourth embodiment.

FIG. 7 is a block diagram of a video storage and retrieval apparatus according to the fourth embodiment of the present invention. In addition, the section with the same function as in FIG. 2 is given the same mark as in FIG. 2 to omit the specific explanation thereof in the following.

In the video storage and retrieval apparatus of this embodiment, temporary storage section 40 is provided between storage section 11, and first demultiplexing section 21 and second demultiplexing section 22. At the time the reproduction or retrieval is executed, the MPEG date stored in storage section 11 is transferred to temporary storage section 40 at a data transfer rate higher than that necessary for the ordinary video reproducing processing to be temporarily stored therein, and the stored data is provided to first demultiplexing section 21 and second demultiplexing section 22 at the same data transfer rate as in the ordinary reproducing processing.

The operation of the video storage and retrieval apparatus in this embodiment is explained below. At the time of video reproduction, part of or entire MPEG stream to be reproduced is transferred to temporary storage section 40 from storage section 11 at the data transfer rate higher than that necessary for the ordinary video reproducing processing. Then, the data is transferred to first demultiplexing section 21 at the same data transfer rate as in the ordinary reproducing processing from temporary storage section 40. First demultiplexing section 21 demultiplexes video streams and audio streams to respectively output to video decoding section 23 and audio decoding section 24. The decoded video signals and audio signals are respectively output from video output section 2 and audio output section 3.

Meanwhile, control section 12 controls storage section 11 so that storage section 11 transfers again the rest of the MPEG stream to be reproduced to temporary storage section 40 before the MPEG stream to be reproduced stored in temporary storage section 40 is all transferred to first multiplexing section 21.

At the time of video retrieval, a user inputs the retrieval request to retrieval section 30. In this case, control section 12 judges whether the MPEG stream to be reproduced is being transferred from storage section 11 to temporary storage section 40, and when the MPEG stream is not being transferred, the MPEG stream for the retrieval is transferred from storage section 11 to temporary storage section 40. Second demultiplexing section 22 fetches the retrieval data streams from the MPEG stream for the retrieval stored in temporary storage section 40, and outputs the identification information in the retrieval data stream to retrieval section 30.

While the data stream for the video reproduction is being transferred to temporary storage section 40 from storage section 11, it is not possible to read out the data stream for the retrieval from storage section 11. However, after all the data steams for the video reproduction are transferred to temporary section 40, or at periods between which the transfer of the data streams for the video reproduction is executed periodically, it is possible to read out the data stream for the retrieval from storage section 11 even while the video is being reproduced.

In the case where storage section 11 is, for example, a medium that can be accessed only sequentially such as VTR, it is not possible to concurrently access a plurality of MPEG streams stored in storage section 11 even with first demultiplexing section 21 and second demultiplexing section 22 provided.

Therefore, as described above, in the case where storage section 11 is the medium that can be accessed only sequentially, by providing a recording medium 40 enabling concurrent accesses to a plurality of MPEG streams next to an output of storage section 11, it is possible to access the plurality of MPEG streams at the same time, and therefore to execute the reproduction of video and audio, and the retrieval at the same time.

Further, since the MPEG stream is transferred to temporary storage section 40 from storage section 11 at the data transfer rate higher than that for the ordinary video reproducing processing, the MPEG stream temporarily stored in temporary storage section 40 is not fully consumed, thus enabling the continuous reproduction.

Fifth Embodiment

Figure 8:
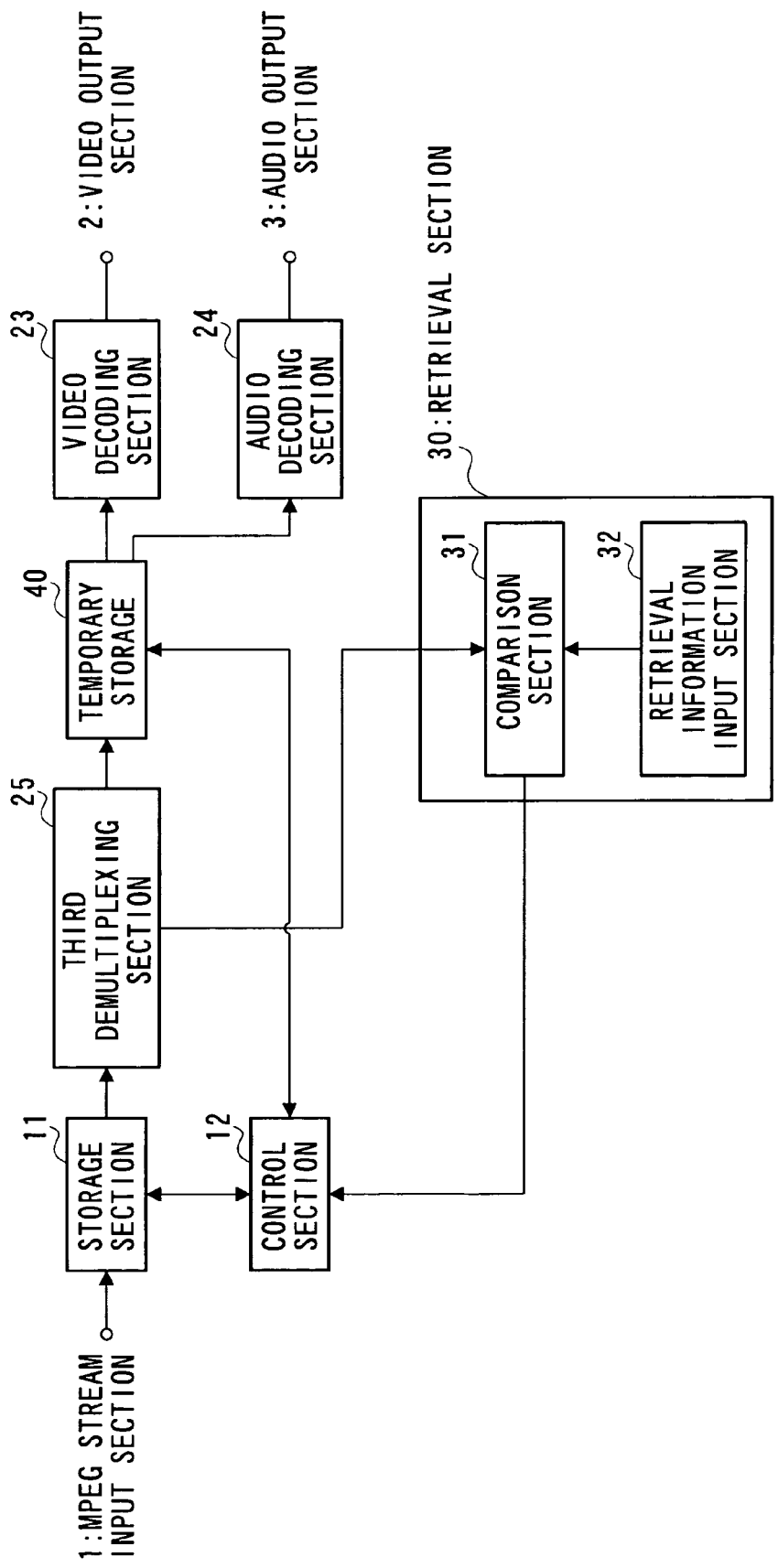
FIG. 8 is a schematic configuration diagram of a video storage and retrieval apparatus according to a fifth embodiment.

FIG. 8 is a block diagram of a video storage and retrieval apparatus according to the fifth embodiment of the present invention. In addition, the section with the same function as in FIG. 2, FIG. 4 or FIG. 7 is given the same mark as in FIG. 2, FIG. 4 or FIG. 7 to omit the specific explanation thereof in the following.

In the video storage and retrieval apparatus of this embodiment, the MPEG stream, in which video streams, audio streams and retrieval data streams are multiplexed, is read from storage section 11, input to third demultiplexing section 25 to be demultiplexed to the video streams, audio streams and retrieval data streams. Then, the video streams and audio streams are stored in temporary storage 40, and at the time of retrieval, the retrieval data streams are input to retrieval section 30. The temporary storage section 40 outputs the video streams and audio streams in parallel respectively to video decoding section 23 and audio decoding section 24.

The operation of the video storage and retrieval apparatus of this embodiment is explained below. At the time of video reproduction, part of or entire MPEG stream to be reproduced is transferred to third demultiplexing section 25 from storage section 11 at the data transfer rate higher than that for the ordinary video reproducing processing. Third demultiplexing section 25 demultiplexes the multiplexed video streams, audio streams and retrieval data streams to the video streams and audio streams, and the retrieval data streams, and transfers the video streams and audio streams to temporary storage section 40 to temporarily store therein. Then, temporary storage section 40 transfers the video streams and audio streams respectively to video decoding section 23 and audio decoding section 24 at the same data transfer rate as in the ordinary reproducing processing. Video decoding section 23 and audio decoding section 24 respectively output the decoded video signals and audio signals.

Meanwhile, control section 12 controls storage section 11 so that storage section 11 transfers again the rest of the MPEG stream to be reproduced to temporary storage section 40 via third demultiplexing section 25 before the video streams and audio streams to be reproduced stored in temporary storage section 40 are all transferred respectively to video decoding section 23 and audio decoding section 24.

When a user inputs the retrieval request to retrieval section 30, control section 12 judges whether the MPEG stream to be reproduced is being transferred from storage section 11 to temporary storage section 40, and when the MPEG stream is not being transferred, the MPEG stream for the retrieval is transferred from storage section 11 to third demultiplexing section 25.

Third demultiplexing section 25 demultiplexes the retrieval data streams from the MPEG stream for the retrieval, and transfers the retrieval data stream to retrieval section 30 to be subjected to retrieve processing.

As described above, in this embodiment, since the retrieval data streams are not stored in temporary storage section 40, it is possible to use temporary storage section 40 of which the capacity is less than that of temporary storage section 40 in the fourth embodiment.

In addition, in the above-mentioned embodiment, it may be possible that temporary storage section 40 is comprised of a random access memory device, the identification data demultiplexed from the MPEG stream as an object for the retrieval is also stored in temporary storage section 40, and that retrieval section 30 executes the retrieval processing using the identification data read from temporary storage section 40.

Further, in the above-mentioned embodiment, it may be possible that temporary storage section 40 is comprised of a random access memory device, third demultiplexing section 25 demultiplexes the MPEG stream as an object to be reproduced and/or for retrieval to the identification data, and streams of multiplexed video data and audio data, temporary storage section 40 stores the streams of video data and audio data, and the decoding section comprised of video decoding section 23 and audio decoding section 24 decodes the streams of video data and audio data.

Furthermore, in the above-mentioned embodiment, it may be possible that temporary storage section 40 is comprised of a random access memory device, third demultiplexing section 25 demultiplexes the MPEG stream as an object to be reproduced and/or for retrieval to the identification data, and streams of multiplexed video data and audio data to respectively store in temporary storage section 40. Then, the decoding section comprised of video decoding section 23 and audio decoding section 24 decodes the streams of video data and audio data, while retrieval section 30 executes the retrieval processing using the identification data read from temporary storage section 40.

Sixth Embodiment

Figure 9:
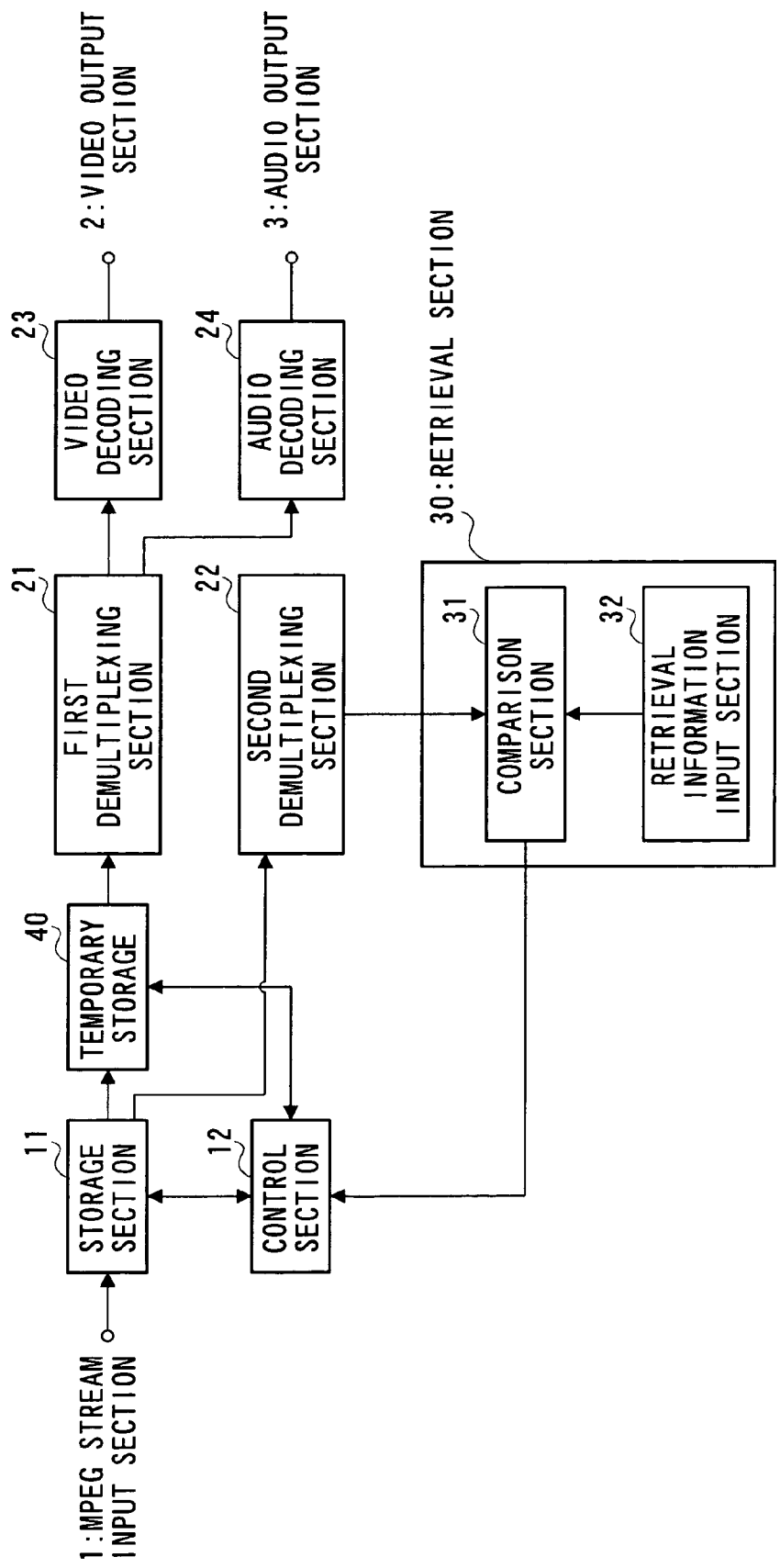
FIG. 9 is a schematic configuration diagram of a video storage and retrieval apparatus according to a sixth embodiment.

FIG. 9 is a block diagram of a video storage and retrieval apparatus according to the sixth embodiment of the present invention. In addition, the section with the same function as in FIG. 2 or FIG. 7 is given the same mark as in FIG. 2 or FIG. 7 to omit the specific explanation thereof in the following.

The video storage and retrieval apparatus of this embodiment has temporary storage section 40 provided between storage section 11 and first demultiplexing section 21 in the configuration of the first embodiment.

The operation of the video storage and retrieval apparatus in this embodiment is explained below. At the time of video reproduction, the MPEG stream stored in storage section 11 is transferred to temporary storage section 40 from storage section 11 at the data transfer rate higher than that for the ordinary video reproducing processing. Then, the MPEG stream is transferred to first demultiplexing section 21 from temporary storage section 40 at the same data transfer rate as in the ordinary reproducing processing. First demultiplexing section 21 demultiplexes video streams and audio streams from the MPEG stream, and outputs video streams and audio streams respectively to video decoding section 23 and audio decoding section 24. Thereby, the decoded video signals and audio signals are output.

Meanwhile, control section 12 controls storage section 11 so that storage section 11 transfers again the rest of the MPEG stream to be reproduced to temporary storage section 40 before the MPEG stream to be reproduced stored in temporary storage section 40 is all transferred to first multiplexing section 21.

When a user inputs the retrieval request to retrieval section 30, control section 12 judges whether the MPEG stream to be reproduced is being transferred from storage section 11 to temporary storage section 40, and when the MPEG stream is not being transferred, the MPEG stream for the retrieval is transferred from storage section 11 to second multiplexing section 22. Second demultiplexing section 22 demultiplexes the retrieval data streams (or identification information) from the MPEG stream to output to retrieval section 30. Retrieval section 30 executes the retrieval processing using the identification information and retrieval scene.

With respect to the data stream comprised of multiplexed video streams, audio streams and retrieval data streams, when the data amount of the retrieval data streams is smaller than that of the video streams and audio streams, second demultiplexing section 22 can execute the demultiplexing processing for demultiplexing the retrieval data streams sufficiently faster than the processing time required for the video reproduction.

Accordingly, even if storage section 11 is a medium that can be accessed only sequentially such as a VTR, it is possible to access a plurality of MPEG streams at the same time.

Seventh Embodiment

Figure 10:
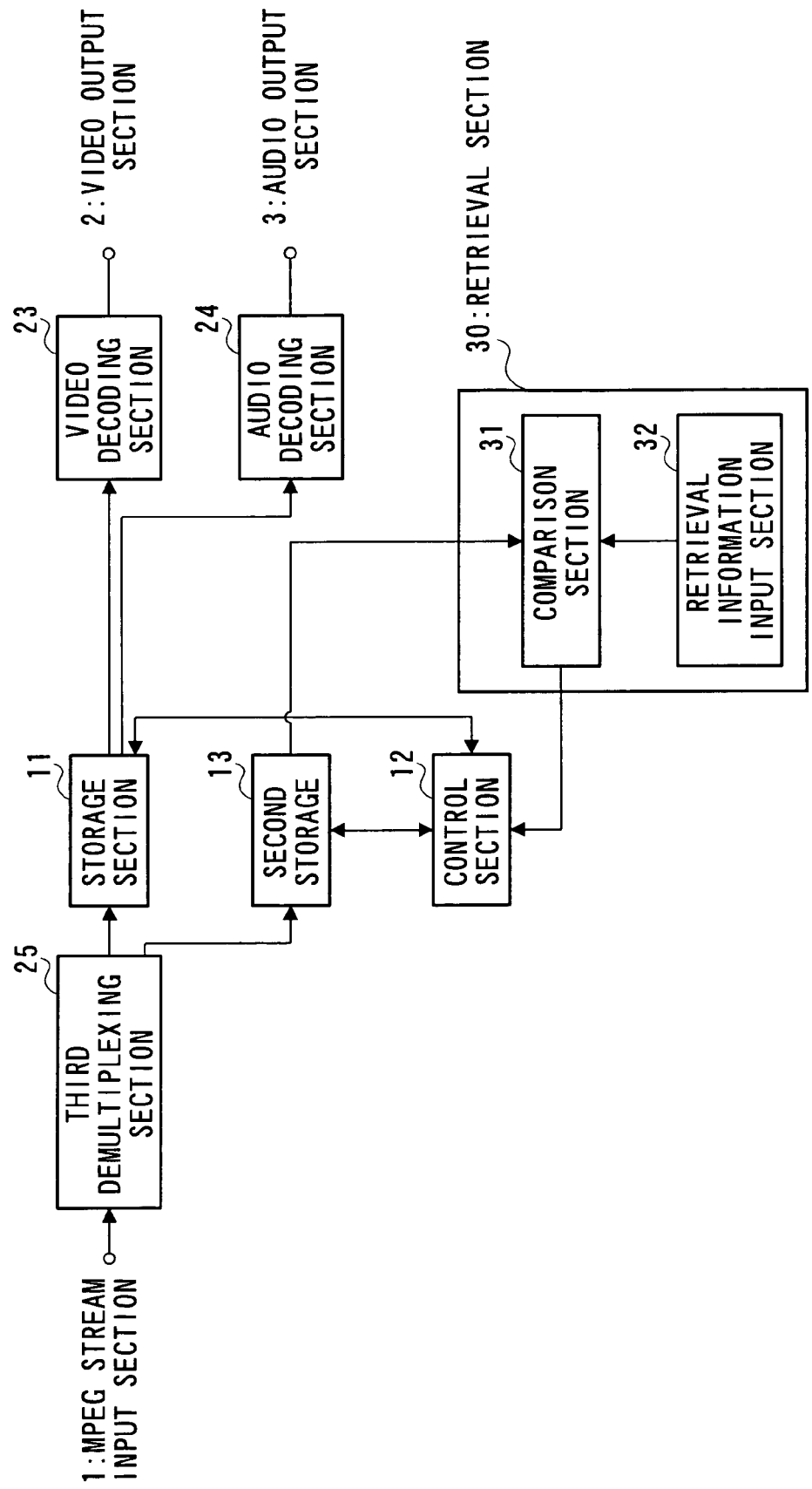
FIG. 10 is a schematic configuration diagram of a video storage and retrieval apparatus according to a seventh embodiment.

FIG. 10 is a block diagram of a video storage and retrieval apparatus according to the seventh embodiment of the present invention. In addition, the section with the same function as in FIG. 2 or FIG. 4 is given the same mark as in FIG. 2 or FIG. 4 to omit the specific explanation thereof in the following.

The video storage and retrieval apparatus of this embodiment has second storage section 13 provided between third demultiplexing section 25 and retrieval section 30 in the configuration of the second embodiment. Second storage section 13 is comprised of a recording device that can be accessed randomly such as a semiconductor memory, HDD, DVD-RAM, PD and optical-magnetic disk alone or in thereof.

The operation of the video storage and retrieval apparatus according to the above embodiment is explained below. The multiplexed MPEG stream input to MPEG stream input section 1 is demultiplexed in third demultiplexing section 25 to video streams, audio streams and retrieval data streams. The demultiplexed video streams and audio streams are stored in storage section 11, and the demultiplexed retrieval data streams are stored in second storage section 13.

At the time of video reproduction, the video streams and audio streams, stored in storage section 11, are respectively input to video decoding section 23 and audio decoding section 24, which respectively output the video and audio. On the other hand, at the time of retrieval, the retrieval data streams, stored in second storage section 13, are input to retrieval section 30, which executes the retrieval processing.

As described above, the multiplexed MPEG stream is demultiplexed to the video streams, audio streams and retrieval data streams before being stored in storage sections, and the video streams and audio streams used for the video reproduction are stored in storage section 11, and the retrieval data streams used for the retrieval are stored in another storage section, i.e., second storage section 13, thereby it is possible to concurrently execute the video reproduction and retrieval in parallel even if storage section 11 is the medium that can be accessed only sequentially such as a VTR. Further, since only the retrieval data streams are stored in second storage section 13 comprised of the recording device that can be accessed randomly, it is possible to execute fast video retrieval.

In addition, in the above-mentioned embodiment, it may be possible to provide fourth demultiplexing section 26 illustrated in FIG. 5 before storage section 11 and second storage section 13 instead of third demultiplexing section 25, and further provide fifth demultiplexing section 27 illustrated in FIG. 5 between storage section 11, and video decoding section 23 and audio decoding section 24. Then, retrieval section 30 may execute the retrieval processing while fetching the identification data from second storage section 13. According to this configuration, it is also possible to execute the fast retrieval, and to concurrently execute the video reproduction and retrieval in parallel, even if storage section 11 is comprised of the medium that can be accessed only sequentially such as the VTR.

Further, in the above-mentioned embodiment, it may be possible that retrieval section 30 executes the retrieval processing while fetching the identification data from second storage section 13, selects a period matching the pre-registered retrieval condition, and stores the streams of video data and audio data demultiplexed from the MPEG stream corresponding to the selected period in storage section 11.

Furthermore, in the above-mentioned embodiment, it may be possible to provide fourth demultiplexing section 26 illustrated in FIG. 5 before storage section 11 and second storage section 13 instead of third demultiplexing section 25, and further provide fifth demultiplexing section 27 illustrated in FIG. 5 between storage section 11, and video decoding section 23 and audio decoding section 24. Then, retrieval section 30 may execute the retrieval processing while fetching the identification data from second storage section 13, select a period matching the pre-registered retrieval condition registered, and store the streams of video data and audio data demultiplexed from the MPEG stream corresponding to the selected period in storage section 11. Otherwise, retrieval section 30 may execute the retrieval processing while fetching the identification data from fourth demultiplexing section 26 not through second storage section 13, select a period matching the per-registered retrieval condition, and store the video streams and audio streams demultiplexed from the MPEG stream corresponding to the selected period in storage section 11.

Eighth Embodiment

Figure 11:
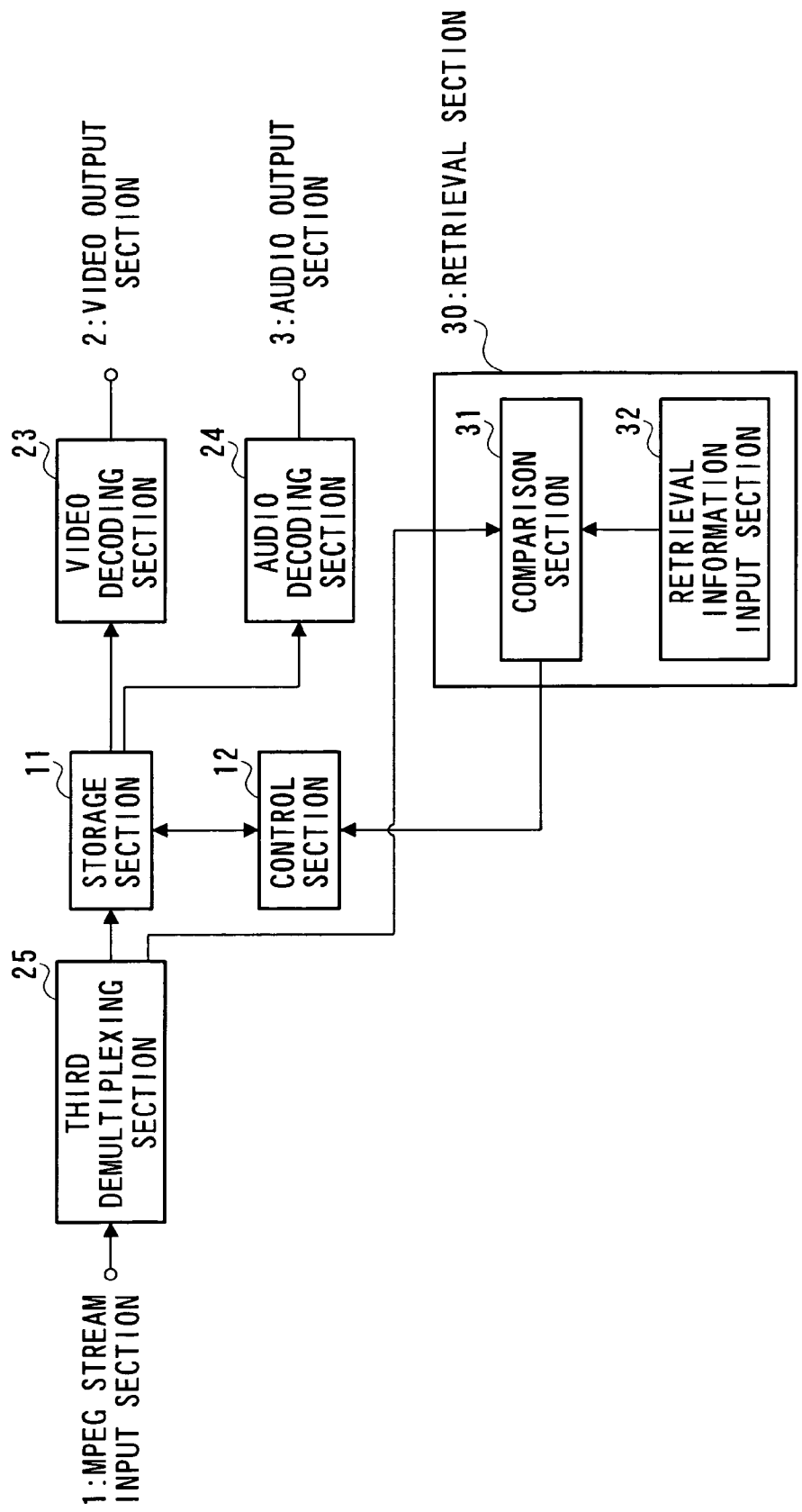
FIG. 11 is a schematic configuration diagram of a video storage and retrieval apparatus according to an eighth embodiment.

FIG. 11 is a block diagram of a video storage and retrieval apparatus according to the eighth embodiment of the present invention. In addition, the section with the same function as in FIG. 2 or FIG. 4 is given the same mark as in FIG. 2 or FIG. 4 to omit the specific explanation thereof in the following.

The video storage and retrieval apparatus of this embodiment has the configuration of the second embodiment, in which the retrieval data streams output from third demultiplexing section 25 are directly input to retrieval section 30.

The operation of the video storage and retrieval apparatus according to this embodiment is explained below. The multiplexed MPEG stream input to MPEG stream input section 1 is demultiplexed in third demultiplexing section 25 to the video streams, audio streams and retrieval data streams. The demultiplexed retrieval data streams are input to directly retrieval section 30 not through storage section 11.

In this embodiment, the retrieval condition input from retrieval information input section 32 is registered in advance in retrieval section 30. Retrieval section 30 compares the identification information contained in the retrieval data stream input from third demultiplexing section 25 to the pre-registered retrieval condition. Then, when the information and condition match, retrieval section 30 outputs a matching signal to control section 12.

When the matching signal is output from retrieval section 30, control section 12 controls storage section 11 to store the video streams and audio streams demultiplexed from the corresponding MPEG stream in storage section 11. As a result, the video and audio at the period matching the condition desired by a user are only stored in storage section 11.

As described above, the retrieval data streams are demultiplexed before the MPEG stream is stored in storage section 11, and input to retrieval section 30, and the period corresponding to the retrieval data stream matching the pre-registered retrieval condition is only stored in storage section 11, thereby enabling the efficient video recording.

In addition, in the above-mentioned embodiment, it may be possible to provide fourth demultiplexing section 26 illustrated in FIG. 5 before storage section 11 instead of third demultiplexing section 25, and further provide fifth demultiplexing section 27 illustrated in FIG. 5 between storage section 11, and video decoding section 23 and audio decoding section 24. Then, retrieval section 30 may execute the retrieval processing while fetching the identification data from fourth demultiplexing section 26, select a period matching the pre-registered retrieval condition, and store the streams of video data and audio data demultiplexed from the MPEG stream corresponding to the selected period in storage section 11.

Ninth Embodiment

Figure 12:
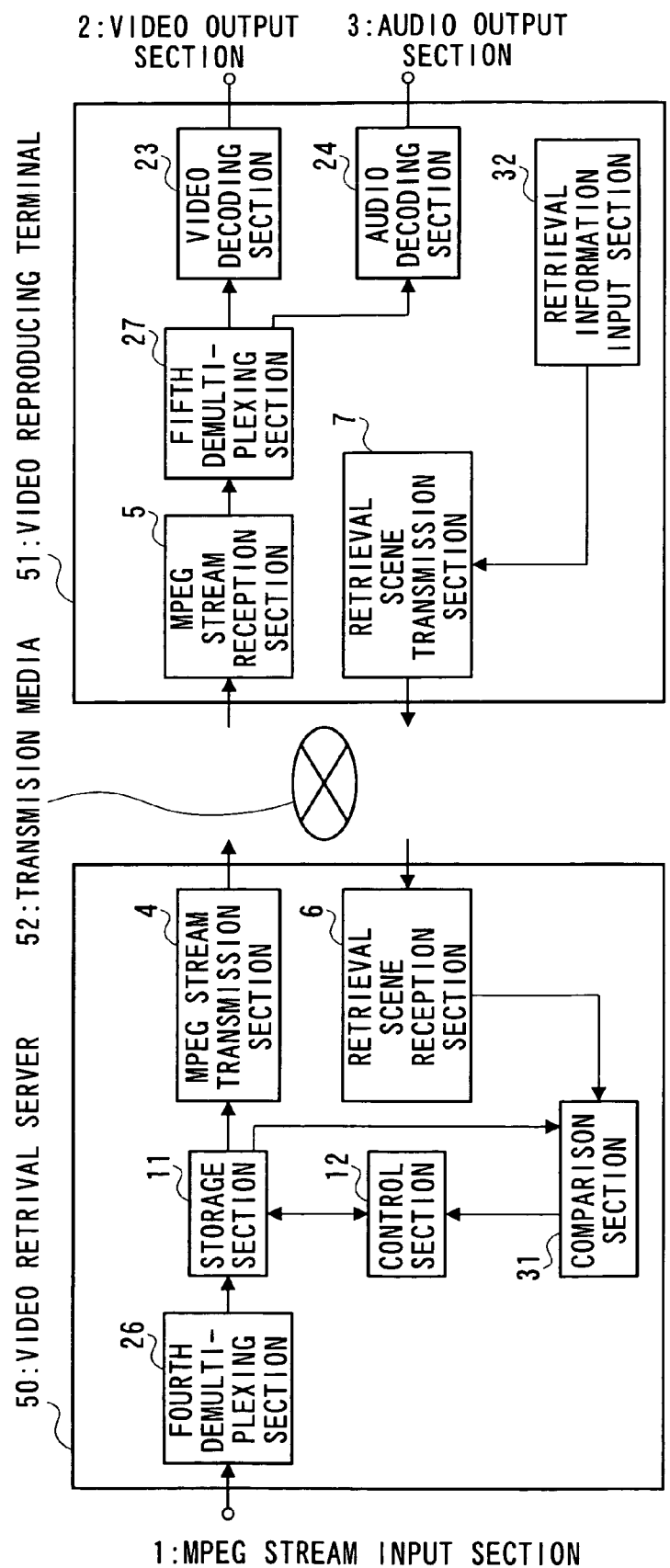
FIG. 12 is a schematic configuration diagram of a video storage and retrieval system according to a ninth embodiment.

FIG. 12 is a block diagram of a video storage and retrieval system according to the ninth embodiment. In addition, the section with the same function as in FIG. 2 or FIG. 5 is given the same mark as in FIG. 2 or FIG. 5 to omit the specific explanation thereof in the following.

The video storage and retrieval system of this embodiment is comprised of video retrieval server 50, video reproducing terminal 51 and transmission media 52.

Video retrieval server 50 is comprised of MPEG stream input section 1, fourth demultiplexing section 25, storage section 11, control section 12, comparison section 31, MPEG stream transmission section 4 which transmits the MPEG stream comprised of multiplexed video data streams and audio data streams, and retrieval information reception section 6 which receives the retrieval information (scene contents).

Video reproducing terminal 51 is comprised of fifth demultiplexing section 27, video decoding section 23, audio decoding section 24, retrieval information input section 32, video output section 2, audio output section 3, MPEG stream reception section 5 which receives the MPEG stream comprised of multiplexed video data streams and audio data streams, and retrieval information transmission section 7 which transmits the retrieval information.

Further, transmission media 52 between video retrieval server 50 and video reproducing terminal 51 are comprised of communication networks, broadcasting networks, or a combination of the communication networks and broadcasting networks.

The operation of the video storage and retrieval system in this embodiment is explained below. When a user inputs the contents to be retrieved from retrieval information input section 32 in video reproducing terminal 51, the input retrieval information is transmitted from retrieval information transmission section 7 through transmission media 52 to video retrieval server 50.

In video retrieval server 50, retrieval information reception section 6 receives the retrieval information. The received retrieval information is input to comparison section 31. Comparison section 31 compares the identification information in the retrieval data streams stored in storage section 11 to the received retrieval information to execute the video retrieval. The video matching the retrieval information is transmitted as multiplexed video and audio streams from MPEG stream transmission section 4 through transmission media 52 to video reproducing terminal 51.

In video reproducing terminal 51, MPEG stream reception section 5 receives the retrieved video and audio streams. The received video and audio streams are demultiplexed in fifth demultiplexing section 27, and the demultiplexed video streams and audio streams are respectively expanded in video decoding section 23 and audio decoding section 24, thus outputting the videos and audioes.

Further, since the retrieval data streams are demultiplexed and stored in storage section 11, it is possible to concurrently execute the processing fast for the retrieval requests from a plurality of terminals.

In addition, when at least the storage section and retrieval section, and at least the video decoding section and audio decoding section in the video storage and retrieval apparatus described in one of the first to eighth embodiments and various modifications thereof are respectively provided at the video retrieval server side, and at the video reproducing terminal, it may be possible to provide the other components at either side, enabling the appropriate design and/or modification.

As described above, according to the present invention, it is possible to concurrently execute the video reproducing processing and retrieval processing in parallel.

Further, according to the present invention, even in the case where the medium that can be accessed only sequentially such as a VTR is used as the storage section, it is possible to concurrently execute the video reproducing processing and retrieval processing.

The present invention is not limited to the above described embodiments, and various variations and modifications may be possible without departing from the scope of the present invention.

This application is based on the Japanese Patent Application No.HEI11-84337 filed on Mar. 26, 1999, entire contents of which is expressly incorporated by reference herein.

What is claimed is:

1. A video storage and retrieval apparatus, comprising:
 a storage section configured to store a data stream in which identification data with identification information for retrieval incorporated therein is multiplexed along with video data and audio data;
 a first demultiplexing section configured to demultiplex said data stream stored in said storage device and to output video data and audio data;
 a second demultiplexing section configured to demultiplex said data stream and output said identification information;
 a decoding section configured to decode and reproduce demultiplexed video data and audio data; and
 a retrieval section configured to retrieve specific video data and specific audio data based on demultiplexed identification data,
 wherein, when a reproduction request and a retrieval request overlap in time, said second demultiplexing section executes a demultiplexing operation to extract the identification data for retrieval from said data stream and said first demultiplexing section executes a demultiplexing operation to extract the video data and the audio data each for reproduction from said data stream in parallel.

2. The video storage and retrieval apparatus according to claim 1, wherein said second demultiplexing section comprises
 a plurality of demultiplexing sections that are configured to execute demultiplexing to extract the identification data for retrieval from said data stream; and wherein said retrieval section comprises
 a plurality of retrieval sections that are configured to retrieve specific video data and specific audio data based on the identification data, wherein said plurality of demultiplexing sections and said plurality of retrieval sections execute retrieval processing on a plurality of data streams in parallel.

3. The video storage and retrieval apparatus according to claim 1, wherein said data stream is input to the demultiplexing section that executes demultiplexing to extract the identification data for retrieval at a data transfer rate higher than a data transfer rate at which said data stream is input to the demultiplexing section that executes demultiplexing to extract the video data and the audio data each for reproduction.

4. The video storage and retrieval apparatus of claim 1, wherein said data stream comprises an MPEG stream conforming to MPEG as a moving picture coding standard.

5. The video storage and retrieval apparatus of claim 4, wherein in said MPEG stream, each of the video data, the audio data and the identification data is constructed in packets, and said packets are multiplexed as a Packetized Elementary Stream.

6. The video storage and retrieval apparatus of claim 4, wherein in said MPEG stream, the identification data is contained in a stream header to include stream information, and is multiplexed along with the video data and the audio data.

7. The video storage and retrieval apparatus of claim 4, wherein in said MPEG stream, the identification data is stored as a private descriptor in at least one of a PAT (Program Association Table), a PMT (Program Map Table) and a CAT (Conditional Access Table), and is multiplexed along with the video data and the audio data.

8. The video storage and retrieval apparatus of claim 4, wherein in said MPEG stream, the identification data is stored as private data section, and is multiplexed along with the video data and the audio data.

9. A video storage and retrieval method, comprising:

storing a data stream in which identification data with identification information for retrieval incorporated therein is multiplexed along with video data and audio data;

reading the stored data stream as an object to be reproduced and the data stream as an object to be retrieved when a reproduction request and a retrieval request overlap in time;

demultiplexing the stored data stream with a first demultiplexer to extract video data and audio data;

demultiplexing the stored data stream with a second demultiplexer to extract identification information; and decoding and reproducing demultiplexed video data and the audio data while retrieving specific video data and specific audio data based on the identification data demultiplexed from the data stream as the object to be retrieved, the extraction of the video data and audio data and the extraction of the identification information occurring in parallel.

* * * * *